(12) United States Patent
Straehle et al.

(10) Patent No.: US 7,445,392 B2
(45) Date of Patent: Nov. 4, 2008

(54) OBSERVATION DEVICE FOR SIDE REGIONS OF A MOTOR VEHICLE

(75) Inventors: Juergen Straehle, Denkendorf (DE); Alexander Boehlendorf, Sindelfingen (DE)

(73) Assignee: Dr. Ing. h.c.F. Porsche Aktiengesellschaft, Weissach (DE)

( * ) Notice: Subject to any disclaimer, the term of this patent is extended or adjusted under 35 U.S.C. 154(b) by 285 days.

(21) Appl. No.: 11/243,321

(22) Filed: Oct. 5, 2005

(65) Prior Publication Data

US 2006/0078325 A1    Apr. 13, 2006

(30) Foreign Application Priority Data

Oct. 6, 2004    (DE) .................. 10 2004 048 718

(51) Int. Cl.
  G03B 17/02    (2006.01)
  G03B 29/00    (2006.01)
  B62D 39/00    (2006.01)
(52) U.S. Cl. ................ 396/419; 396/429; 348/148; 296/1.11
(58) Field of Classification Search ................. 396/325, 396/419, 424, 427, 429, 428; 348/42, 47, 348/118, 837, 148; 382/104; 70/28; 296/1.11
See application file for complete search history.

(56) References Cited

U.S. PATENT DOCUMENTS

2005/0040941 A1* 2/2005 Schofield et al. ............ 340/442

FOREIGN PATENT DOCUMENTS

| DE | 10043099 | 3/2002 |
| DE | 10237988 | 4/2003 |
| EP | 1316476 | 6/2003 |
| EP | 1437261 | 7/2004 |

OTHER PUBLICATIONS

European Search Report dated Jan. 13, 2006.

* cited by examiner

*Primary Examiner*—W. B. Perkey
*Assistant Examiner*—Rishi S Suthar
(74) *Attorney, Agent, or Firm*—Crowell & Moring LLP

(57) ABSTRACT

For observing lateral areas of a motor vehicle, a camera is inserted into an existing cavity of a mirror base. The camera is clampingly held between a holding cage and a covering cap. An opening for a camera lens is provided in the covering cap. Through the camera lens opening, the lateral vehicle areas can be observed and displayed in an indicating device of an inside rearview mirror.

19 Claims, 3 Drawing Sheets

OBSERVATION DEVICE FOR SIDE REGIONS OF A MOTOR VEHICLE

BACKGROUND OF THE INVENTION

The present invention relates to an observation device for lateral areas of a motor vehicle, and more particularly to an observation device which has an outside rearview mirror inserted into a protective housing which is connected with the vehicle body by means of a mirror base equipped with a covering, and the outside rearview mirror comprises a shooting device consisting of a camera on the driver side facing away from the driver, which shooting device interacts with an indicating device in the inside rearview mirror of the vehicle.

An observation device for lateral areas of motor vehicles is known from DE 100 43 099 A1, in which a camera is connected with a monitor in the interior of the vehicle on which the image taken by the camera is displayed. Furthermore, DE 102 37 988 A1 shows a camera arranged directly in the housing accommodating the rearview mirror. With this camera, a lateral vehicle area is detected in an observing manner and is supplied to a display screen.

SUMMARY OF THE INVENTION

An object of the present invention to provide an observation device having a shooting device, such as a camera, and an indicating device which can easily be mounted in an outside rearview mirror and provides the possibility of an observation of lateral vehicle areas during a maneuvering operation or other driving operations.

According to the invention, this object has been achieved by providing characterized in that the camera is arranged in a cavity formed by the mirror base and an enveloping mirror base covering between an interior holding cage and an exterior covering cap, which covering cap has an opening for a camera lens oriented toward the road, and in that the covering cap is, on the one side, connected with the holding cage and is, on the other side, fixed in a cutout of the mirror base covering by way of detent and/or fastening devices.

Among the principal advantages achieved by the present invention are that the camera can be inserted into an existing cavity of the mirror base and no receiving space for the camera has to be created in the mirror housing as had been previously required as shown in the aforementioned DE 012 37 988 A1. In particular, it is provided according to the present invention provides that the camera is arranged in a cavity formed by the mirror base and an enveloping mirror base covering between an interior holding cage and an exterior covering cap. The latter has an opening for a camera lens oriented toward the road. On the one side, the covering cap is connected with the holding cage and, on the other side, is held in a cutout of the mirror base covering by detent and/or fastening devices. This permits a simple mounting of the camera in the mirror base, and the camera itself can be arranged close to the vehicle and does not protrude from the mirror housing.

So that, according to the invention, the camera can be switched off during the observation operations, the present invention provides that the shooting device in the outside rearview mirror as well as the indicating device in the inside rearview mirror can automatically be switched on by way of the ignition during each start of the operation of the vehicle and that a switch is arranged in the electric control circuit which, as a function of a speed signal of the vehicle, permits an automatic switching-on or a manual switching-off of the shooting device and the indicating device. It is thereby ensured that the camera and thus the indicating device in the vehicle interior is operative and can be switched off manually only, for example, during driving operations starting at a higher speed. Also, the camera should automatically switch on during each new ignition even if the camera had previously been switched off.

According to the invention, the camera is arranged below the mirror base surrounded by the covering, for the purpose of which it protrudes with respect to the mirror base covering toward the outside. The holding cage for the camera has bent-away legs for the fastening by way of screwing devices with the covering cap and, together with the camera and the covering cap, forms a construction unit which can be preassembled and which can be inserted into the cavity from the outside. The camera is adjusted and arranged in the mirror base such that a lateral vehicle area extending from in front of an A-column to behind a B-column can be taken by the camera and can be observed by the indicating device. As a result, according to the invention, a constant observation of areas becomes advantageously possible which cannot be seen by the driver in the sitting position.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
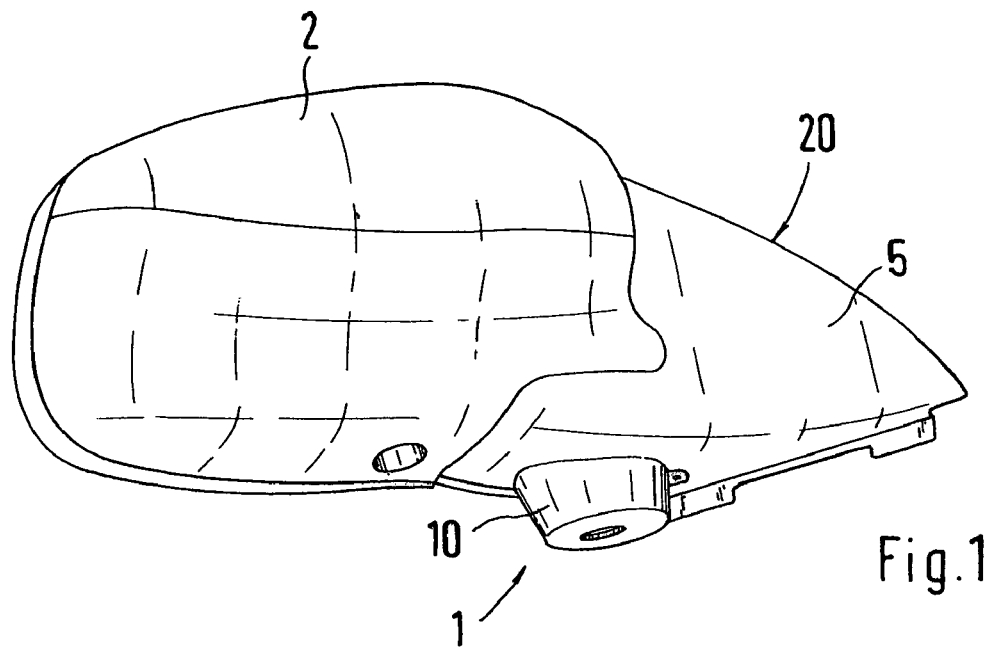
FIG. 1 is a somewhat perspective view of a side rearview mirror as seen from the front as viewed in the vehicle driving direction with an observation device installed in the mirror base.
Figure 2:
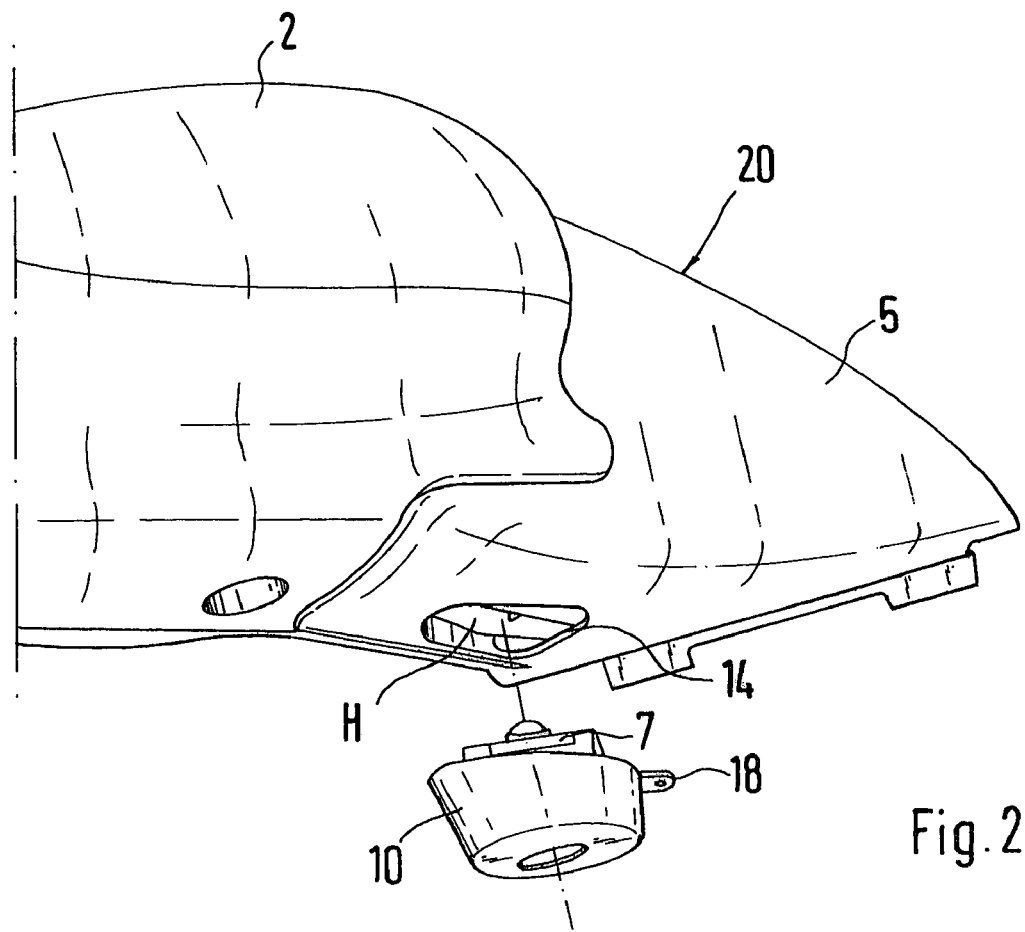
FIG. 2 is a view similar to FIG. 1 but with the observation device removed.
Figure 3:
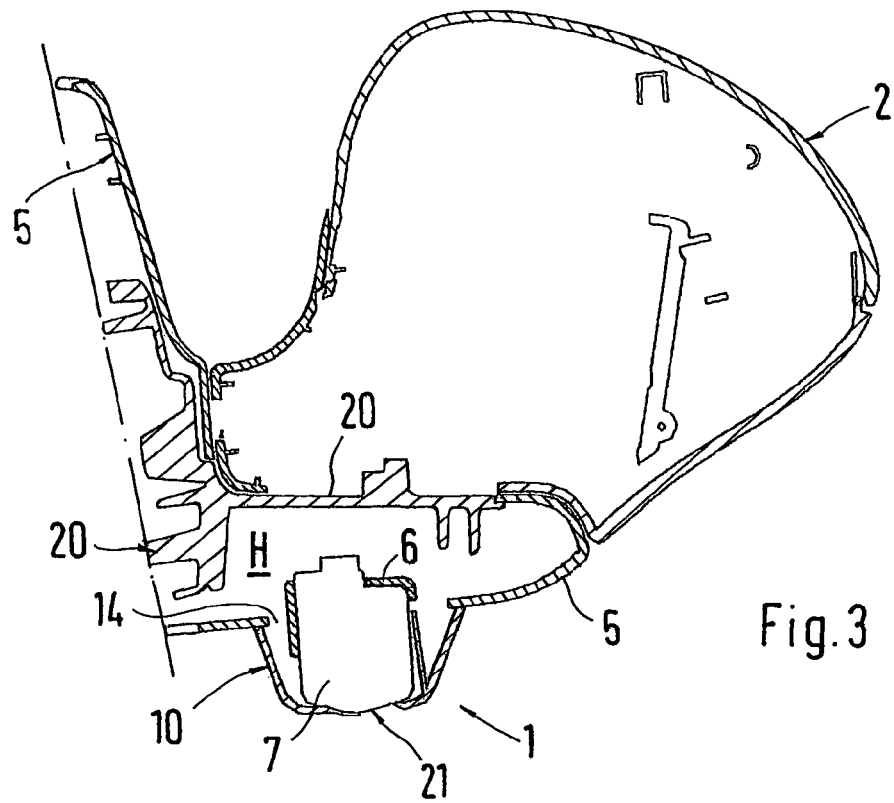
FIG. 3 is a sectional view of the rearview mirror of FIG. 1 with the installed observation device.

An observation device 1 for the lateral areas of a motor vehicle, which cannot be directly seen by the driver, comprises a shooting device, such as a camera 7 as seen in FIG. 2, in a lateral rearview mirror 2 and an indicating device 4 (FIG. 4), for example, in an inside rearview mirror, in the vehicle interior, the indicating device 4 consisting of a display or the like.

Figure 6:
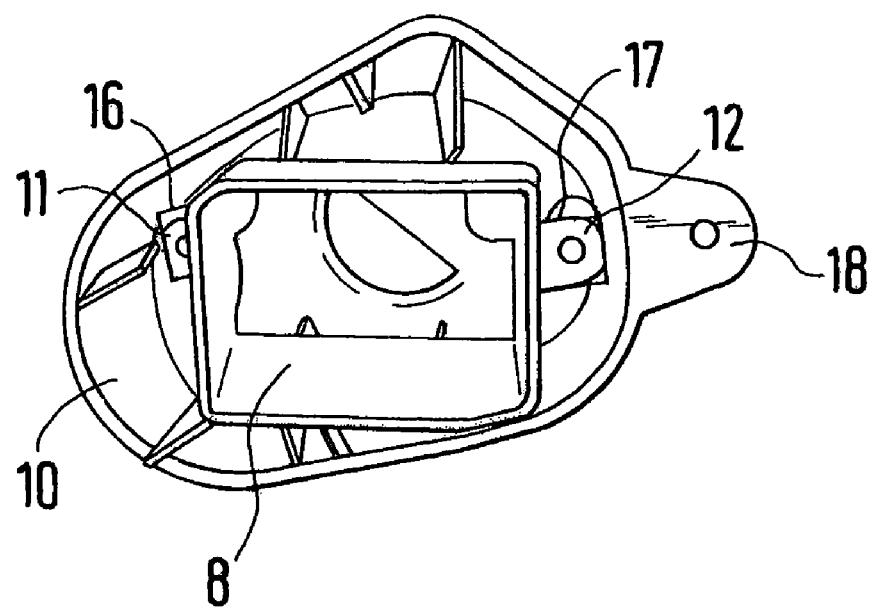
FIG. 6 is a top view of the device shown in FIG. 5.

The camera 7 is arranged in an existing cavity H of a mirror base 20 and a mirror base covering 5 surrounding the latter and is held in a stationary manner between a holding cage 8 and a covering cap 10 in a cutout 14. For this purpose, the holding cage 8 as seen best in FIG. 6 is screwed to the covering cap 10 by bent-away legs 11, 12 receiving conventional fastening devices. The holding cage 8 has all-around walls and a partial floor for supporting the camera. The covering cap 10 is constructed as a shell-shaped part and is rounded on the exterior side.

The covering cap 10 can be preassembled with the holding cage 8 and the camera 7, can then be inserted into the cutout 14 of the covering cap 10 and fixedly connected with the covering cap 10 by detent and/or fastening devices. The holding cage 8 is provided in the interior of the cavity H of the mirror base 20 or of the mirror base covering 5, and the covering cap 10 is provided on the exterior of the mirror base covering 5. According to the present invention, such an interior arrangement of the camera 7 in the cavity H of the mirror base 20 is also contemplated. The covering cap can then be at the same level with the mirror base covering 5 in the cutout 14 of this mirror base covering 5.

The camera 7 is preferably arranged below the mirror base 20 surrounded by the mirror base covering 5 and is or can be provided to project to the surface of the covering 5.

A support of the holding cage 8 on the covering plate 10 is effected by the two bent-away legs 11, 12 which can be screwed to shaped-on parts 16, 17 in the interior of the covering cap 10. The covering cap 10 itself can be fixed in the cutout 14 by detent devices, clips or other conventional clamping devices. In addition, screwing devices can be used which are held in a tongue 18 and can be screwed into the mirror base covering 5 or into the mirror base.

Figure 4:
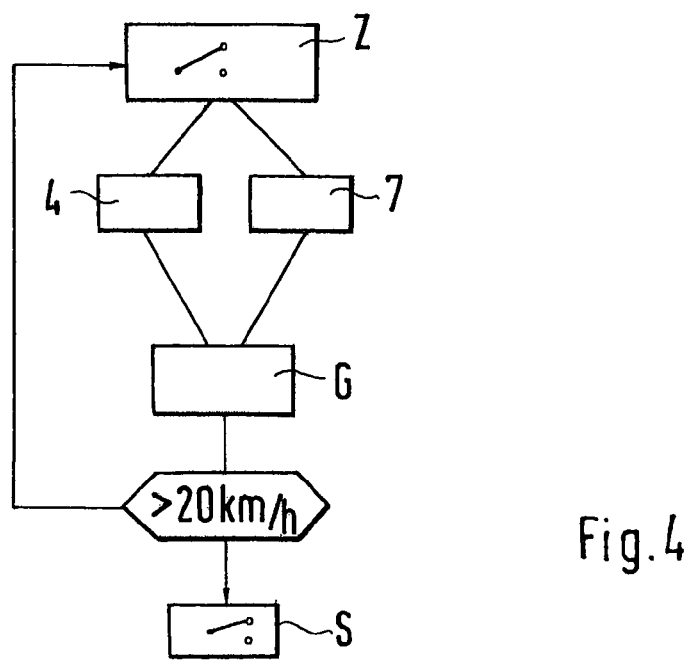
FIG. 4 is a diagram illustrating the switching-on and off concerning the shooting and the indicating device.
Figure 5:
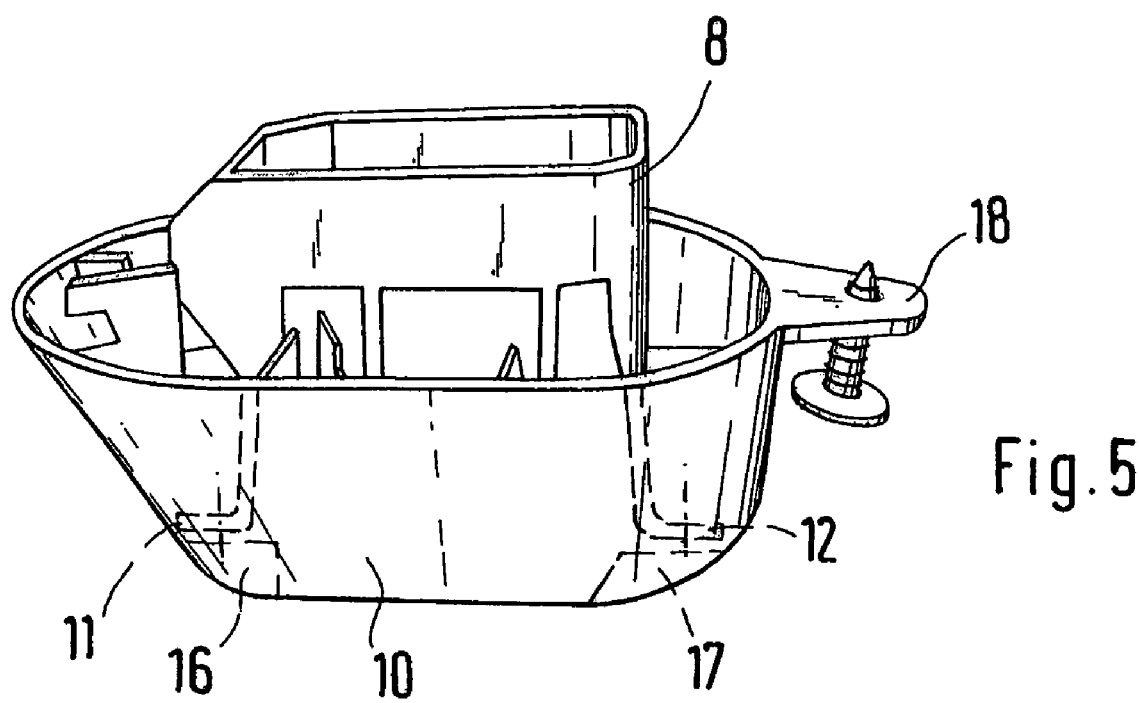
FIG. 5 is a somewhat perspective side view of the device with a holding cage and a covering cap.

As illustrated, for example, in the diagram according to FIG. 4, the shooting device (e.g. camera 7) as well as the indicating device 4 should operate when the ignition by way of the ignition lock Z of the vehicle takes place. That is, the camera 7 as well as the indicating device 4 are automatically switched on, and a retrieval of the driving speed at G and a query as to whether the vehicle is driving at a corresponding speed, for example, >20 km/h, results in a switching-off of the shooting and indicating device 4, 7 respectively taking place, for example, by way of a switch S. As soon as the vehicle is started again the ignition lock Z, the shooting and indicating device 4, 7 will be activated again, even if a switching-off took place in the previous driving operation. In each case, the shooting and indicating device 4, 7 can reactivate themselves at low speeds occurring during parking or maneuvering operations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Observation device for lateral areas of a motor vehicle, comprising an outside rearview mirror insertable into a protective housing operatively connected with a body of the motor vehicle via a mirror base equipped with an enveloping covering, and a shooting device configured as a camera on a driver side facing away from the driver, wherein
the camera is held between and interior holding cage and an exterior covering cap within a cavity formed by the mirror base and the enveloping covering, which exterior covering cap has an opening for a orientating camera lens toward the road and is, on one side, connectable with the interior holding cage and, on another side, extends into a cutout of the mirror base covering and fixed therein via at least one of detent and fastening devices.

2. The observation device according to claim 1, wherein
the shooting device is operatively connected with an indicating device arranged at an inside rearview mirror, with the shooting and indicating devices being configured to be automatically switchable on each time operation of the vehicle is started via an ignition, and a switch is arranged in an
electric control circuit, so that as a function of a speed signal of the motor vehicle, an automatic switching-off of the shooting and indicating devices is permitted.

3. The observation device according to claim 1, wherein the camera is arranged below the mirror base surrounding the mirror base covering, and the covering cap projects toward the outside with respect to the mirror base covering.

4. The observation device according to claim 3,
wherein the shooting device is operatively connected with an indicating device arranged at an inside rearview mirror, with the shooting and indicating devices being configured to be automatically switchable on each time operation of the vehicle is started via an ignition, and a switch is arranged in an electric control circuit, so that as a function of a speed signal of the motor vehicle, an automatic switching-off of the shooting and indicating devices is permitted.

5. The observation device according to claim 1, wherein the holding cage includes bent-away legs for fastening thereof to the covering cap screwing devices, and the holding cage comprises a preassembled construction unit with the camera and the covering cap, so as to be insertable from the outside into the cavity.

6. The observation device according to claim 5, wherein
the shooting device is operatively connected with an indicating device arranged at an inside rearview mirror, with the shooting and indicating devices being configured to be automatically switchable on each time operation of the vehicle is started via ignition, and a switch is arranged in an
electric control circuit, so that as a function of a speed signal of the motor vehicle, an automatic switching-off of the shooting and indicating devices is permitted.

7. The observation device according to claim 5, wherein the camera is arranged below the mirror base surrounding the mirror base covering, and the covering cap projects toward the outside with respect to the mirror base covering.

8. The observation device according to claim 1, wherein the camera is arranged in the mirror base in such that lateral vehicle areas extending from in front of an A-column to behind a B-column can be accessed by the camera and observed by the indicating device.

9. The observation device according to claim 8, wherein
the shooting device is operatively connected with an indicating device arranged at an inside rearview mirror, with the shooting and indicating devices being configured to be automatically switchable on each time operation of the vehicle is started via ignition, and a switch is arranged in an electric control circuit, so that as a function of a speed signal of the motor vehicle, an automatic switching-off of the shooting and indicating devices is permitted.

10. The observation device according to claim 9, wherein the camera is arranged below the mirror base surrounding the mirror base covering, and the covering cap projects toward the outside with respect to the mirror base covering.

11. The observation device according to claim 10, wherein the holding cage includes bent-away legs for fastening thereof to the covering cap screwing devices, and the holding cage comprises a preassembled construction unit with the camera and the covering cap, so as to be insertable from the outside into the cavity.

12. The observation device according to claim 1, wherein the covering cap extends at the same level with the exterior surface of the mirror housing covering, and an opening for a camera lens is provided in the covering cap.

13. The observation device according to claim 12,
wherein the shooting device is operatively connected with an indicating device arranged at an inside rearview mirror, with the shooting and indicating devices being configured to be automatically switchable on each time operation of the vehicle is started via ignition, and a switch is arranged in an electric control circuit, so that as a function of a speed signal of the motor vehicle, an automatic switching-off of the shooting and indicating devices is permitted.

14. The observation device according to claim 13, wherein the camera is arranged below the mirror base surrounding the mirror base covering, and the covering cap projects toward the outside with respect to the mirror base covering.

15. The observation device according to claim 14, wherein the holding cage includes bent-away legs for fastening thereof to the covering cap screwing devices, and the holding cage comprises a preassembled construction unit with the camera and the covering cap, so as to be insertable from the outside into the cavity.

16. The observation device according to claim 15, wherein the camera is arranged in the mirror base in such that lateral vehicle areas extending from in front of an A-column to behind a B-column can be accessed by the camera and observed by the indicating device.

17. The observation device according to claim 12, wherein the camera is arranged below the mirror base surrounding the mirror base covering, and the covering cap projects toward the outside with respect to the mirror base covering.

18. The observation device according to claim 12, wherein the holding cage includes bent-away legs for fastening thereof to the covering cap screwing devices, and the holding cage comprises a preassembled construction unit with the camera and the covering cap, so as to be insertable from the outside into the cavity.

19. The observation device according to claim 12, wherein the camera is arranged in the mirror base in such that lateral vehicle areas extending from in front of an A-column to behind a B-column can be accessed by the camera and observed by the indicating device.

* * * * *